H. J. TRANA.
EMERGENCY TRUCK.
APPLICATION FILED NOV. 8, 1916.

1,236,626.

Patented Aug. 14, 1917.

Inventor
HJALMAR J. TRANA

By Watson E. Coleman
Attorney

UNITED STATES PATENT OFFICE.

HJALMAR J. TRANA, OF KINDRED, NORTH DAKOTA.

EMERGENCY-TRUCK.

1,236,636.

Specification of Letters Patent. Patented Aug. 14, 1917.

Application filed November 8, 1916. Serial No. 130,229.

*To all whom it may concern:*

Be it known that I, HJALMAR J. TRANA, a citizen of the United States, residing at Kindred, in the county of Cass and State of North Dakota, have invented certain new and useful Improvements in Emergency-Trucks, of which the following is a specification, reference being had to the accompanying drawings.

This invention comprehends certain new and useful improvements in automobile appliances or accessories, and relates particularly to an attachment designed for use in an emergency should the rear axle of an automobile break while out on the road.

The invention has for its primary object a practical, durable and efficient construction of device of this character, the parts of which may be easily manufactured and readily assembled, and which will not take up much space but may be easily carried along with the tools and other appliances underneath the rear seat or in any other storage compartment with which the automobile is equipped, the device being so constructed and arranged that it may be very easily and quickly clamped upon the rear axle and differential housing of the car should the axle break at any time.

And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

Figure 1:
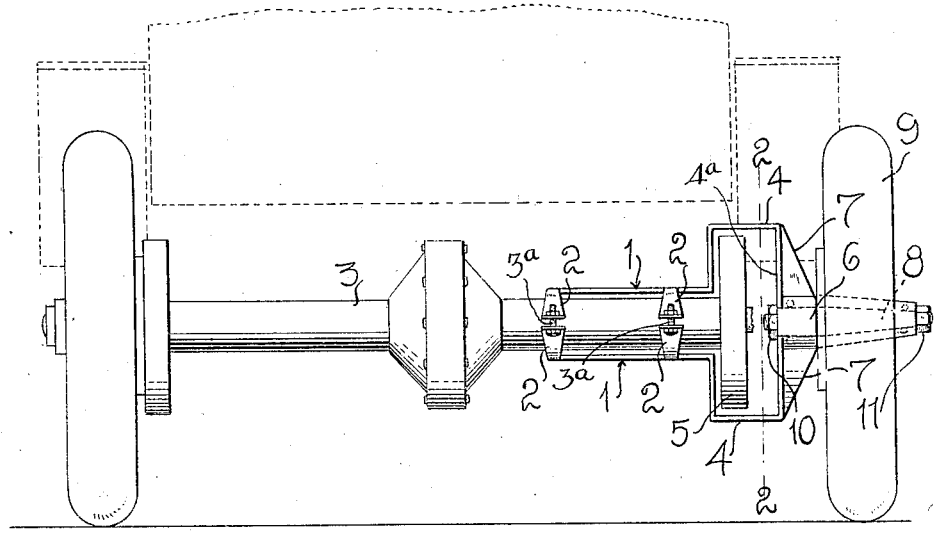
Figure 2:
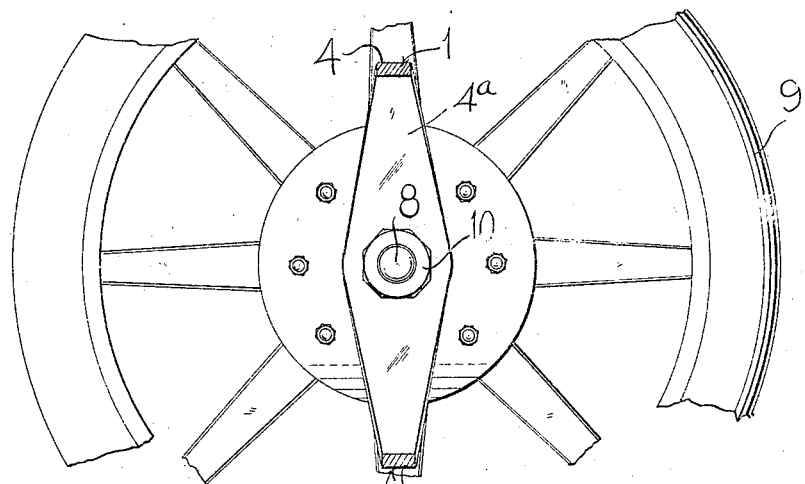

For a full understanding of the invention, reference is to be had to the following description and accompanying drawing, in which, Figure 1 is a rear elevation of an automobile showing my improved emergency truck attached thereto, and Fig. 2 is a vertical sectional view on the line 2—2 of Fig. 1.

Corresponding and like parts are referred to in the following description and designated in all of the views of the accompanying drawing by like reference characters.

In carrying out my invention, I provide any desired number of bars 1 which are provided at any desired points along their length with the laterally directed clamping members 2 so that the frame of which the bars 1 form a part, may be easily and quickly clamped upon either end of a rear axle and differential housing 3, by the bolts 3ᵃ as clearly illustrated in the drawing.

Preferably, the frame bars 1 are formed at their outer ends with laterally extending angular portions 4 terminating in the inwardly directed arms 4ᵃ whereby they may be passed around the usual or conventional brake band disk 5, said arms 4ᵃ supporting at their outer extremities a boxing 6, co-acting with the arms 4ᵃ and the boxing 6 are the brace webs 7.

An emergency axle 8 is designed to be received within the boxing 6, and to employ therein the usual roller bearings taken out of the usual boxing upon the breaking of the rear axle of the car, 9 designating the rear ground or traveling wheel of the broken axle which is adapted to be journaled upon the emergency axle 8. The axle 8 is provided at its inner end with a nut 10 by which it is held in place in the boxing 6, and the wheel 9 is secured on the axle 8 by means of a nut 11, and pins or keys.

From the foregoing description, in connection with the accompanying drawing, the operation of my improved truck attachment for automobiles will be apparent. When the device is not desired for use, it will occupy comparatively little space in the storage compartment of the automobile and should either of the rear axles break, the frame bars 1 may be readily clamped by the members 2 upon the housing 3, and the emergency axle 8 brought into service and journaled within the boxing 6, the rear wheel 9 being held thereon as hereinbefore specified. Thus it will be understood that no extra wheel is required.

While the accompanying drawing illustrates what I believe to be the preferred embodiment of my invention, it is to be understood that the invention is not limited thereto but that various changes may be made in the construction, arrangements and proportions of the parts without departing from the scope of the invention as claimed.

What is claimed, is:

An emergency attachment for automobiles comprising bars having laterally directed arms, bolts co-acting with said arms for clamping the bars to the axle housing, the outer ends of the bars being provided with angular portions designed to pass around the break band disk and terminating in inwardly directed arms, a boxing arranged at the inner ends of the arms, brace webs co-acting with the inwardly directed arms and the boxing, and an emergency axle rotatably supported by the boxing.

In testimony whereof I hereunto affix my signature in the presence of two witnesess.

HJALMAR J. TRANA.

Witnesses:
ADOLPH DOKKEN,
H. W. HABLENSTAD.